United States Patent
Singh et al.

(12)

(10) Patent No.: US 6,517,861 B2
(45) Date of Patent: Feb. 11, 2003

(54) COMPOSITION OF HERBAL BISCUITS FOR LACTATING MOTHERS ACTING AS DIETARY SUPPLEMENT AND PROCESS FOR PREPARATION THEREOF

(75) Inventors: Anil Kumar Singh, Lucknow (IN); Rattan Lal Bindra, Lucknow (IN); Janardan Singh, Lucknow (IN); Sushil Kumar, Lucknow (IN)

(73) Assignee: Council of Scientific and Industrial Research (IN)

( * ) Notice: Subject to any disclaimer, the term of this patent is extended or adjusted under 35 U.S.C. 154(b) by 0 days.

(21) Appl. No.: 09/766,805

(22) Filed: Jan. 22, 2001

(65) Prior Publication Data

US 2002/0136783 A1 Sep. 26, 2002

(51) Int. Cl.$^7$ ................................................ A61K 47/00
(52) U.S. Cl. .................. 424/439; 424/400; 424/441; 424/464; 424/489; 424/725
(58) Field of Search ................................. 424/400, 439, 424/441, 464, 489, 725

(56) References Cited

U.S. PATENT DOCUMENTS 6,136,316 A * 10/2000 Mehrotra et al. ........... 424/439

FOREIGN PATENT DOCUMENTS

GB   2314270 A * 12/1997 .......... A61K/35/78

* cited by examiner

*Primary Examiner*—Thurman K. Page
*Assistant Examiner*—Charesse Evans
(74) *Attorney, Agent, or Firm*—Christie, Parker & Hale, LLP

(57) ABSTRACT

An herbal dietary supplement composition for lactating mothers, comprising the required quantum of one or more herbs selected from Groups A to D, wherein the herbs from Group A being comprised of medicinal plant materials having galactagogue properties, Group B being comprised of medicinal plant materials having adaptogenic and anti-stress properties, Group C being comprised medicinal plant materials having hepatoprotective properties and Group D being comprised of medicinal plant materials having digestive and appetite improving properties, along with a required quantum of additives selected from nutritive flour and optional frying, flavoring, coloring and dressing agents, and a process for preparing the composition.

25 Claims, No Drawings

COMPOSITION OF HERBAL BISCUITS FOR LACTATING MOTHERS ACTING AS DIETARY SUPPLEMENT AND PROCESS FOR PREPARATION THEREOF

BACKGROUND OF THE INVENTION

The term dietary supplement was formally defined by U.S. Government office in 1994 as a product (other than tobacco) intended to supplement the diet to enhance health that bears or contains one or more of the dietary ingredients viz.: vitamins, minerals, amino acids, herbs or other botanicals or a dietary substance for use to supplement the diet by increasing the total dietary intake, and is intended for ingestion in the form of capsule, powder, soft gel, gel capsule and not represented as a conventional food or as a sole item of a meal or the diet. [Dietary supplement Health and Education Act (DSHEA) Public Law 103–417, Oct. 25, 1994; codified at 42 use 287C-11].

Mental makeup of the people depend considerably on the food articles which they consume and it is very well illustrated by a set of verses in the Hindu's famous religious book *Bhagwat Gita* XVIII 8–10. The lactating mothers require a very nutritive diet to keep them fit after the delivery. At the height of lactation 1.5 liters of milk may be formed each day. With this degree of lactation, great quantities of metabolic substrates are drained. 50 grams of fat enters the milk each day, approximately 100 grams of lactose derived from glucose is lost, 2–3 gm. calcium phosphate producing decalcification of bone specific problem during lactation. [A. C. Guyton: *Textbook of Medical Physiology* W. B., Saunders Company West Washington Square Philadelphia Pa. 19105 PP. 996 1986]. General dietary habits are not sufficient to fulfil the requirement of all nutrients of the body. The secretion of milk requires energy and the body has three folds demand for calories during lactation. There is need of sufficient fuel to permit the women to carry out the ordinary day to day activities. Activity of the mammary glands and energy content of milk secreted are the two important requirements. The inefficiency of some women in converting food into milk has been found to be crucial at the time of specific function of lactation. Loss of weight during lactation is fairly common, with women with malnutrition.

To maintain harmonious balance between the different aspects of life, the quality of food improved considerably in terms of its food value and taste with the advancement of civilization. Preventive measures are probably the most effective method of dealing with these conditions and such measures should include diet and dietary supplements. Many neutraceutical compositions, health foods, drinks and supplements are available in the market but only few compositions/products are available in form of neutraceutical biscuits especially for lactating mothers.

Theraptein manufactured & marketed by Raptakos, Brett and Co. Ltd. MIC. DHA TV Rocha 40211160, Velacheri Road, Chennai, India contains following ingredients for 5 gm (approximate) Protein (mainly casein) 1.5 gm, Carbohydrate 2.4 gm, Fat 0.7 gm, Thiamine hydrochloride 0.25 mg, Riboflavin 0.25 mg, Nicotinamide 0.25 mg, 22 calories per biscuit intact protein. It claims to supply vital protein of high biological value. It is useful for those who due to illness or faulty dietary habit, do not take sufficient amount of protein and make up quantitatively and qualitatively the protein exhaustion, common to house wives, school going children and business and professional men.

Second brand name "GRD Bix" biscuits manufactured and marketed by Cadila Health Care Ltd. 16, Azad Society Ambawadi, Ahmedabad 380015 contains following ingredients per 5 gm approximate Protein (mainly casein) 1.4 gm, Fat 0.7 gm, Carbohydrate 2 gm, Calcium 40 mg, Phosphorus 38 mg, Iron 100 mg, Vitamin A 266 I.D., Vitamin D 17 I.U., Nicotinamide 2.5 mg, Vitamin B2 225 mg, Vitamin B1 165 mg, Vitamin B6 50 mg, Folic acid 0.8 mg, Vitamin B12 0.8 mg, Copper 20 mg, Manganese 1.2 mg, Zinc 75 mg. It is recommended as a nutritional supplement for under weight, general ill health for aged, growing children, teenagers, athletes, travelers, businessmen, pregnant women and lactating mothers.

These biscuits have been enriched adding nutritional ingredients from synthetic sources. However nothing has been supplemented to increase the secretion of mammary gland for those women who are not very much efficient of converting food into milk. These drawbacks have been over come in the present composition of sweet biscuits made up of mixtures of natural ingredients.

Objects of the Present Invention

The main object of the present invention is to develop a composition of herbal biscuits for lactating mothers, which acts as dietary supplement and process for the preparation thereof.

Another object of the invention is to provide a composition, which activates and regulates the secretion of mammary glands to increase lactation.

Yet another object of the invention is to provide a composition which improves the digestion and appetite of the lactating mothers by regulating the metabolic activities.

Yet another object of the invention is to provide a composition, which improves the adaptogenic, and imunomodulating systems of the body to reduce the stress and feeling of fatigue which is very much common amongst the lactating mothers.

Yet another object of the invention is to provide a composition to act as a preventive and rejuvenative nutritive supplement.

Field of the Invention

The present invention relates to a composition of herbal biscuits for lactating mothers acting as dietary supplement and the process for the preparation thereof. The composition of the present invention has nutritive digestive, stimulant and appetite improving properties attributed to a polyherbal composition of many natural herbs along with nutritive flours which not only compensate the essential dietary requirements of lactating mothers, but also act as a preventive and rejuvenate health supplement which relieves stress and fatigue in daily life.

SUMMARY OF THE INVENTION

To meet the above objectives, the present invention provides a composition of herbal biscuits for lactating mothers acting as a dietary supplement and a process for the preparation of the composition.

DETAILED DESCRIPTION OF THE INVENTION

The invention provides a herbal dietary supplement composition for lactating mothers, said composition comprising required quantum of one or more herbs selected from each of Group A to Group D, wherein the herbs form Group A comprising medicinal plant materials having galactagogue properties, Group B comprising medicinal plant materials having adaptogenic and anti-stress properties, Group C comprising medicinal plant materials having hepatoprotective properties and Group D comprising medicinal plant materials having digestive and appetite improving properties, along with required quantum of additives selected from nutritive flour and optional frying, flavoring, coloring and dressing agents (Table 1).

Table 1 contains nutritive flours of Soyabean, Buckwheat, Moong, Wheat, Bazra, Bengal gram along with Carrot juice in combination with many plants having (A) Galactagogue (lactogenic) properties, (B) Adaptogenic and imunomodulating properties, (C) Hepatoprotective properties and (D) digestive and appetite improving properties along with *Piper longum* (Pippali), and *Piper nigrum* (Kali mirch) which enhances the absorption of these drugs in the body system. The natural preservative like *Curcuma longa* (Haldi) has been added in the preparation, which besides its versatile medicinal properties bears good preservative activities due to its strong antioxidant and antimicrobial activities.

TABLE 1

Group A - Medicinal plants with galactagogue (Lactogenic) activities

1. *Asparagus racemosus* (Satawar) - rhizome and roots
2. *Amaranthus spinosa* (Kataili chaulai) - seeds
3. *Carum carvi* (Shyah jeera) - seeds
4. *Leptadenia reticulata* (Jeevanti) - seeds
5. *Ziziphus maritiana* (Jujuba) - berry
6. *Nigella sativa* (Kalauji) - seeds
7. *Chenopodium ambrosiodes* - seeds
8. *Ferula foetida* (Hing) - gum resin
9. *Grewia hirsuta* (Kukurbicha)- roots Group B - Medicinal plants with adaptogenic and anti-stress activities 1. *Withania somnifera* (Aswagandha) - rhizome and roots
2. *Ocimum sanctum* (Tulsi) - leaves
3. *Picrorrhiza kurroa* (Kutuki) - roots
4. *Sida cordifolia* (Bala) - stem and roots
5. *Boerhaavia diffusa* (Punarnava) - whole plant
6. *Bacopa monniera* (Brahmi) - whole plant
7. *Tinospora cordifolia* (Guduchi) - stem
8. *Diospyrus malabarica* Syn. *D. peregrina* (Kalan Kendu)- stem bark
9. *Albizzia lebeck* (Sirish) - stem bark
10. *Cissampelos pareira* (Patha) - stem Group C - Medicinal plants with hepatoprotective activities 1. *Glycyrrhiza glabra* (Mulethi) - roots
2. *Boerhaavia diffusa* (Punarnava) - whole plant
3. *Phyllanthus amarus* (Bhumyalaki) - whole plant
4. *Eclipta alba* (Bhrigraja) - whole plant
5. *Piper longum* (Pippali) - seeds
6. *Tephrosia purpurea* (Sharpunkha)- leaves
7. *Ocimum sanctum* (Tulsi) - leaves
8. *Picrorrhiza kurroa* (Kukuti) - roots and rhizome
9. *Andrographis paniculata* (Kalmegh)- whole plant
10. *Fumaria parviflora* (Parpat) - whole plant Group D - Medicinal spices with digestive and appetite improving activities.

1. *Piper nigrum* (Kalimirch) - seeds
2. *Zingiber officinale* (Adrak) - rhizome
3. *Curcuma longa* (Haldi) - rhizome
4. *Trachyspermum ammi* (Ajowan) - seeds
5. *Terminalia chebula* (Hard)- fruit rind
6. *Piper longum* (Pipplai) - fruit TABLE 1-continued Group E - Nutritive nuts/seeds 1. Kamal gatta (Seeds of *Nelumbo nuciflora*) after removing seed coat
2. Til Seeds (*Sesamum indicum*)
3. Posta Dana (Seeds of *Papaver somnifera*)

Further, the present invention provides a composition for preparing herbal biscuits, nugget or powder for lactating mothers acting as dietary supplement and the process for the preparation thereof. This process comprising:

(i) frying of 0.25–0.5 g. *Curcuma longa* powder in 0.5–1 g. purified butter for 5–10 minutes until it turns brown;

(ii) adding of 40–60 g. nutritive flour along with 0.25–0.5 g. purified butter (ghee) and frying the mixture to become pink, keeping it to room temperature;

(iii) adding 15–18 g. sweetening agent along with powdered form of one or more therapeutic herbs selected from Groups A, B and C plants in ratio 3:4:2 along with 1 g. each of the medicinal spices of group D from nos. 1–5;

(iv) homogenizing the mixture thoroughly and adding fresh carrot juice 30–45 ml, making it as a paste;

(v) molding in different sizes and dressing with cardamom seed or poppy seeds; and (vi) baking at temperature 140–150° C. for 5–7 minutes.

The preferred composition of present invention comprises preparation of a phytomedicinal composition of therapeutic herbs of groups A, B & C plants in the ratio of 3.5:4.5:2. The plants were cleaned, washed with water and shade dried. All the plant materials were powdered and sieved separately. The plant powders were mixed in above ratio by weight in the amount mentioned against each and homogenized.

The plant material from Group A having lactogenic properties, like Asparagus racemosa 1.5–4 gm, Amaranthus spinosa 0.5–2 gm and Carum carvi .5–1 gm, and plant from Group B having adaptogenic and imunomodulating properties *Withania somnifera* 3–5 gm, *Picrorrhiza Kurroa* .5–2 gm, *Bacopa monniera* 1–2 gm and *Tinospora cardifolia* .5–2 gm and plants from Group C having hepatoprotective properties *Glycyrrhiza glabra* 2–4 gm, *Eclipta alba* .5–1 gm and *Boerhavia diffusa* 1–2 gm. In second step 0.25–5 gm *Curcuma longa* powder is fried lightly in frying pan with .5–1 gm Ghee or purified butter. Powders of seeds of *Nelumbo nuciflora* (Kamal gatta) 2–5 gm and *Sesamum indicum* seed 1–2 gm are added with nutritive flours prepared by mixing wheat flour 15–18 gm with soya flour 7–10 gm, Bengal gram 2–4.5 gm buck wheat 5–8 gm and powdered leaves of *Moringa oleifera* (Sahajan) 3–7 gm. This is fried on medium heat for 5 to 10 minutes in 1.5 gm Ghee with constant stirring till light pink colour is obtained. To the fried material 18 gm powdered sugar or date sugar was added and mixture was homogenized in a mixture grinder along with phytomedical composition of therapeutic herbs prepared in first step, and followed by addition of ground mixture of *Piper longum, Piper nigrum, Terminalia chebula Zingiber officinale* and *Trachyspermum ammi* (one gm each) and again homogenized till the mixture was uniform. Homogeneous mixture thus prepared is made into a paste with the help of fresh carrot juice 20–35 ml and spread into 0.2–0.3 cm thick layer with the help of a thinner and cut into small rounded diskettes by a mold. Finally ground cardamom is sprinkled on this diskettes and baked in an oven. The biscuits thus prepared are wrapped in waxy paper to protect from moisture.

In an embodiment of the invention the plants having lactogenic properties are selected from group A comprising of the plants namely *Amaranthus spinosa, Leptadenia reticulata, Ziziphus moritiana, Nigella sativa, Chenopodium ambrosides, Ferula aesfotida* and *Grewia hirsuta*.

In another embodiment, plants having of adaptogenic & imunomodulating properties are selected from Group B comprising of the plants namely *Withania somnifera, Boerhaavia diffusa, Bacopa monniera, Tinospora cordifolia, Diospyrus peregrina, Albizzia lebeck* and *Cissompelos pareira*.

In yet another embodiment of the present invention the plants having of hepatoprotective activities are selected from the group C comprising of the plants *Fumaria parviflora, Glycyrrhiza glabra, Boerhaavia diffusa, Phyllanthus amarus, Eclipta alba, Piper longum, Tephrosia purpurea, Ocimum sanctum, Picrorrhiza Kurroa, Andrographis paniculata* and are selected in respective ratio of the group.

In another embodiment of the invention only wheat flour along with leaves of *Moringa oleifera* is mixed or flours i.e. soya (Glycine max), buck wheat (*Fagopyrum esculentum*), green gram (*Vigna radiata*) or Bengal gram (*Cicer arientinum*) is incorporated in the composition.

In another embodiment of the invention, the sweetening agent is selected from sugar, date sugar or any other sweetening agent.

In yet another embodiment of the invention, the composition is prepared as powder, biscuit, capsule, nugget, gel or any other forms, which can be taken with water, milk or other liquid foods.

In yet other embodiment of the invention powder from the members of group B plants having adaptogenic imunomodulating properties i.e. *Withania somnifera, Ocimum sanctum, Picrorrhiza kurroa, Sida cordifolia, Boerhaavia diffusa, Bacopa monniera, Tinospora cordifolia, Diospyrus peregrine, Albizzia lebeck,* and *Cissompelos pareira,* which are selected as a nutrient food supplements for General health.

In still another embodiment of the invention members of various combinations of Group C plants having of hepatoprotective properties e.g. *Glycyrrhiza glabra, Boerhaavia diffusa, Phyllanthus amarus, Eclipta alba, Piper longum, Tephrosia purpurea, Ocimum sanctum, Picrorrhiza kurroa, Andrographis paniculata,* and *Fumaria parviflora* which are added as liver protective agents.

In yet another embodiment of the invention, single plant providing more than one property can be selected for example, *Ocimum sanctum* having adaptogenic and anti-stress activities also have hepatoprotective activities. In this case, that quantum of the single plant should be the required quantum or the pharmaceutically acceptable amount.

In yet another embodiment of the invention, medicinal plants *Ocimum sanctum, Boerhaavia diffusa* and *Picrorrhiza kurroa* having adaptogenic and anti-stress activities also have hepatoprotective activities.

In yet another embodiment of the invention, medicinal plant *Piper longum* is having hepatoprotective property as well as digestive and appetite improving activity.

In still another embodiment aspect of the invention dietary supplement for lactating women provides phytoestrogen, micronutrients, antioxidants and elements to enhance calcium absorption and utilization. The cumulative beneficial and preventive effects have been achieved by this dietary supplement.

The sum total of properties of composition is entirely different from its individual components. The different composition has been described and which are illustrated by following examples and therefore, should not be construed to limit the scope of invention.

EXAMPLE 1

Ingredients per Hundred Grams
Dried sieved powder of—Group A Plants

| | |
|---|---|
| 1. *Asparagus racemosa* | 4 gm |
| 2. *Amaranthus spinosa* | 2 gm |
| 3. *Carum carvi* | 1 gm |

Group B Plants

| | |
|---|---|
| 1. *Withania somnifera* | 5 gm |
| 2. *Picrorrhiza kurroa* | 2 gm |
| 3. *Bacopa monniera* | 2 gm |
| 4. *Tinospora cardifolia* | 2 gm |

Group C Plants

| | |
|---|---|
| 1. *Glycyrrhiza glabra* | 2 qm |
| 2. *Eclipta alba* | 1 gm |
| 3. *Boerhaavia diffusa* | 2 gm |

Group D Plants (Digestive and appetizers)

| | |
|---|---|
| 1. *Trachyspermum ammi* | 1 gm |
| 2. *Piper longum* | 1 gm |
| 3. *Piper nigrum* | 1 gm |
| 4. *Terminalia chebula* | 1 gm |
| 5. *Zingiber officinale* | 1 gm |
| 6. *Curcuma longa* | 1 gm |

Composition of Nutritive flours as base

| | |
|---|---|
| 1. Wheat flour | 15 gm |
| 2. Soya flour | 10 gm |
| 3. Flour of Bengal gram | 5 gm |
| 4. Buck wheat | 7 gm |
| 5. *Moringa oleifera* (Sahajan) powdered leaves | 5 gm |
| 6. seeds of *Nelumbo nuciflora* (Kamal gatta) | 5 gm |
| 7. seeds of *Sesamum indicum* | 2 gm |

Other additives for frying, flavoring and dressing materials

| | |
|---|---|
| 1. 1. Ghee (Purified butter) | 2 gm |
| 2. Sugar/date sugar powder | 15 gm |
| 3. Carrot juice (dry weight 2.5 gm) | 35 ml |
| 4. Cardamom seed | 1.5 gm |
| 5. Poppy seeds | 1 gm |

The process of preparation of herbal biscuits comprises following steps:
1. preparation of phytomedicinal composition of therapeutical herbs;
2. preparation of nutritive flours;

3. addition of sugar and medicinal spices; and 4. preparation of flavored paste and baking.

Identified and cleaned plant materials were ground and sieved separately. They were mixed in quantities indicated as above from group A, B & C plants respectively. The mixture was homogenized in a mixture grinder with 1 gm each of ground medicinal spices from group D except *Curcuma longa*.

The nutritive flour was prepared by mixing Soya wheat, Buck wheat and Bengal gram flours along with the powdered leaves of *Moringa oleifera* and kernel of Kamal gatta (seeds after removing seed coats) in the quantities specified above.

0.5 gm of *Curcuma longa* powder is then fried with 0.5 gm of Ghee (purified butter) in a frying pan and the nutritive flour prepared earlier was added along with 1.5 gm ghee and the mixture was then fried until turning a light pink color. The mixture is then cooled at room temperature and sugar powder (18 gm) added along with the preparation made in the earlier step one.

To the above preparation sufficient quantity of fresh carrot juice (30–40 ml dry wt. 2.5 gm) was added and a uniform paste was made and spread in a 0.2–0.3 cm thick layer. Small diskettes were then cut using a mold. Lastly cardamom and Poppy seeds were sprinkled on all diskettes. The diskettes were then baked in an electric oven for 15 minutes.

The prepared biscuits were tasty and widely accepted by the lactating mothers, no adverse or side effects were reported by the ladies after 30 days continuous consumption of 2 diskettes taken two times daily. In a sample field trial the biscuits were used by ten lactating mothers engaged in physical labor for 30 days who reported enhancement in secretion of mammary glands and improvement in physical stress after the daily physical labor.

ADVANTAGES

The main advantages of the present invention are:

1. The present composition contains phytomedicinal combination having galactagogue (lactogenic) properties, which increase the secretion of mammary glands.

2. Four groups of therapeutically active plants having galactagogue, adaptogenic/imunomodulating, hepatoprotective, digestive and appetite improving properties have been incorporated which improve the physiological and metabolic activities and rejuvenate the body to relieve fatigue and stress conditions of the body.

3. Leaves of *Moringa oleifera* are added in the preparation of nutritive flour, which increases the input of calcium, vitamin A and other vital minerals needed for lactating mothers.

4. There are certain medicinal spices like *Piper nigrum*, *Piper longum* which act as bio-enhancers and also produce good taste to the composition in addition to their therapeutic properties.

5. *Curcuma longa* having versatile medicinal properties acts as natural preservative due to its antimicrobial and antioxidant properties.

6. The present composition has nutritive and tonic properties along with curative and preventive actions to promote regulation of body functions for extended time periods.

7. The flours utilized in the composition provide a source of carbohydrate, protein and fat and are also rich in essential nutrients like calcium, phosphorus, iron, vitamins, iodine, and amino acids which are important for lactating mothers. Carotene and polyphenols present in these flours also act as antioxidants.

8. Soya flour has the highest protein content among the plant products and has important fatty acids viz., linoleic and linolenic acid (also called omega 3 and omega 6 fatty acids) which promote improved heart function and lower the blood stream cholesterol. It further supplies phytoestrogens to minimize the effect of estrogen women.

9. Bengal gram utilized in the composition provides a rich source of folic acid, also important for lactating women.

10. Buckwheat is rich source of rutin, which increases capillary fragility and provides a source of iodine, important for lactating mothers.

11. Compositions comprising of Group B plants i.e. with adaptogenic and imunomodulating properties are good for general health.

12. Composition comprising of only Group C plants i.e. having hepatoprotective properties is good for liver functioning.

13. To minimize the processing done to make the biscuits, as all the therapeutic herbs are shade dried, ground to make powder while it has been added without processing in powder form of the composition therefore chances of loss of activity has been minimised.

14. By utilizing whole plant drugs and all natural components as such there is a least chance of toxicity or side effects.

What is claimed:

1. An herbal dietary supplement composition for lactating mothers, said composition comprising one or more herbs selected from each of Group A to Group D, the herbs from Group A comprising 5 to 13 parts by weight of medicinal plant materials having galactagogue properties, Group B comprising 4 to 12 parts by weight of medicinal plant materials having adaptogenic and anti-stress properties, Group C comprising 3 to 11 parts by weight of medicinal plant materials having hepatoprotective properties and Group D comprising 4 to 8 parts by weight of medicinal plant materials having digestive and appetite improving properties, along with additives selected from nutritive flour in the range of 40 to 60 parts by weight and optional frying, flavouring, coloring, sweetening and dressing agents in the range of 15 to 30 parts by weight.

2. A composition as claimed in claim 1 wherein, Group A plants having galactagogue properties are selected from *Asparagus racemosus, Amaranthus spinosa, Carum carvi, Leptadenia reticulata, Ziziphus maritiana, Nigella sativa, Chenopodium ambrosiodes, Ferula foetida,* and *Grewia hirsuta*.

3. A composition as claimed in claim 1 wherein, Group B plants having adaptogenic and anti-stress properties are selected from *Withania somnifera, Ocimum sanctum, Picrorrhiza kurroa, Sida cordifolia, Boerhaavia difussa, Bacopa monniera, Tinospora cordifolia, Diospyrus malabarica, Albizzia lebeck* and *Cissampelos pareira*.

4. A composition as claimed in claim 1 wherein, Group C plants having hepatoprotective properties are selected from *Glycyrrhiza glabra, Eclipta alba, Boerhaavia difussa, Phyllanthus amarus, Piper longum, Tephrosia purpurea, Ocimum sanctum, Picrorrhiza kurroa, Andrographis paniculata* and *Fumaria parviflora*.

5. A composition as claimed in claim 1 wherein, medicinal spices of Group D having digestive and appetite improving activities are selected from *Piper nigrum, Zingiber officinale, Curcuma longa, Trachyspermum ammi, Terminalia chebula* and *Piper longum*.

6. A composition as claimed in claim 1 wherein the nutritive flour are selected from flours of Soya (*Glycine*

*max*), buck wheat (*Fagopyrum esculentum*), green gram (*Vigna radiata*), Bengal gram (*Cicer arietinum*), wheat flour, seeds of powdered *Nelumbo nuciflor* (Kamal gatta), seeds of powdered *Sesamum indicum* and powdered leaves of *Moringa olifera* (Sahjan).

7. A composition as claimed in claim 1 wherein, the plants *Ocimum sanctum, Boerhaavia difussa* and *Picrorrhiza kurroa* are used for adaptogenic and anti-stress activities and also for hepatoprotective activities.

8. A composition as claimed in claim 1 wherein, the plant *Piper longum* is used for hepatoprotective property as well as digestive and appetite improving activities.

9. A composition as claimed in claim 1 wherein, the parts of herbal material used are selected from rhizome, roots, seeds, gum resin, leaves, stems, fruits or whole plants.

10. A composition as claimed in claim 1 wherein, the sweetening agents are selected from sugars, date sugar or sweeteners.

11. A composition as claimed in claim 1 wherein, the frying material is selected from butter, ghee or vegetable oils.

12. A composition as claimed in claim 1 wherein, the said herbal composition is in the form of powder, biscuit, capsule, nugget, gel or any other forms, which can be consumed with water, milk or other liquid foods.

13. A process for the preparation of herbal dietary supplement composition for lactating mothers, said process comprising mixing one or more herbs selected from each of Group A to Group D, the herbs from Group A comprising 5 to 13 parts by weight of medicinal plant materials having galactagogue properties, Group B comprising 4 to 12 parts by weight of medicinal plant materials having adaptogenic and anti-stress properties, Group C comprising 3 to 11 parts be weight of medicinal plant materials having hepatoprotective properties and Group D comprising 4 to 8 parts by weight of medicinal plant materials having digestive and appetite improving properties, along with additives selected from nutritive flour in the range of 40 to 60 parts by weight and optional frying, flavouring, coloring, sweetening and dressing agents in the range of 15 to 30 parts by weight.

14. A process as claimed in claim 13 wherein, parts of herbal material used are selected from rhizome, roots, seeds, gum resin, leaves, stems, fruits or whole plants.

15. A process as claimed in claim 13 wherein, Group A plants having galactagogue properties are selected from *Asparagus racemosus, Amaranthus spinosa, Carum carvi, Leptadenia reticulata, Ziziphus maritiana, Nigella sativa, Chenopodium ambrosiodes, Ferula foetida,* and *Grewia hirsuta*.

16. A process as claimed in claim 13 wherein, Group B plants having adaptogenic and anti-stress properties are selected from *Withania somnifera, Ocimum sanctum, Picrorrhiza kurroa, Sida cordifolia, Boerhaavia diffusa, Bacopa monniera, Tinospora cordifolia, Diospyrus malabarica, Albizzia lebeck* and *Cissampelos pareira*.

17. A process as claimed in claim 13 wherein, Group C plants having hepatoprotective properties are selected from *Glycyrrhiza glabra, Eclipta alba, Boerhaavia diffusa, Phyllanthus amarus, Piper longum, Tephrosia purpurea, Ocimum sanctum, Picrorrhiza kurroa, Andrographis paniculata* and *Fumaria parviflora*.

18. A process as claimed in claim 13 wherein, medicinal spices of Group D having digestive and appetite improving activities are selected from *Piper nigrum, Zingiber officinale, Curcuma longa, Trachyspermum ammi, Terminalia chebula* and *Piper longum*.

19. A process as claimed in claim 13 wherein, the nutritive flour additives are selected from flours of Soya (*Glycine max*), buck wheat (*Fagopyrum esculentum*), green gram (*Vigna radiata*), Bengal gram (*Cicer arientinum*), wheat flour, seeds of powdered *Nelumbo nuciflora* (Kamal gatta), seeds of powdered *Sesamum indicum* and powdered leaves of *Moringa oleifera* (Sahajan).

20. A process as claimed in claim 13 wherein, the sweetening agents are selected from sugars, date sugar or sweeteners.

21. A process as claimed in claim 13 wherein, the frying material is selected from butter, ghee or any other vegetable oil.

22. A process as claimed in claim 13 wherein, the herbal composition is prepared as powder, biscuit, capsule, nugget, gel or any other forms, which can be consumed with water, milk or other liquid foods.

23. A process of preparing herbal biscuits or powder for lactating mothers acting as a dietary supplement, said process comprising the steps of:
    (a) preparing phytomedicinal composition of therapeutical herbs selected from one or more members of Group A to Group D, wherein Group A plants having galactagogue properties, Group B plants having adaptogenic and anti-stress properties, Group C plants having hepatoprotective properties, and Group D plants having digestive and appetite improving properties;
    (b) preparing a nutritive flour;
    (c) adding sugar and medicinal spices; and
    (d) mixing all the above to obtain a flavoured paste and baking the paste to obtain the biscuits, nugget or powder.

24. A process as claimed in claim 23 wherein, the process of preparing the herbal biscuits further comprising frying of 0.25–0.5 g. *Curcuma longa* powder in 0.5–1 g. purified butter for 5–10 minutes until it turns brown, adding of 40–60 g. nutritive flour along with 0.25–0.5 g. purified butter (ghee) and frying the mixture to become pink, keeping it to room temperature and then adding 15–18 g. sweetening agent along with one or more therapeutic herbs selected form Group A, B and C plants in ratio 3:4:2 along with 1 g. each of the medicinal spices of group D, in their powdered form, homogenizing the mixture thoroughly and adding fresh carrot juice 30–45 ml, making paste and molding into different sizes and dressing with cardamom seed or poppy seeds and baking at a temperature between 120–150° C. for 5–7 minutes.

25. A process of preparing herbal biscuits, nuggets or powder for lactating mothers acting as a dietary supplement, said process comprising the steps of:
    (a) preparing phytomedicinal composition of therapeutical herbs selected from one or more members of Group A to Group D, wherein Group A plants having galactagogue properties, Group B plants having adaptogenic and anti-stress properties, Group C plants having hepatoprotective properties, and Group D plants having digestive and appetite improving properties;
    (b) preparing a nutritive flour;
    (c) frying of 0.25–0.5 g. *Curcuma longa* powder in 0.5–1 g. purified butter for 5–10 minutes until it turns brown;
    (d) adding of 40–60 g. nutritive flour along with 0.25–0.5 g. purified butter (ghee) and frying the mixture to become pink, keeping it to room temperature and then adding 15–18 g. sweetening agent along with one or more therapeutic herbs selected from Group A, B and C plants in ratio of 3:4:2 along with 1 g. each of the medicinal spices of group D, in their powdered form; and (e) homogenizing the mixture thoroughly and adding 30–45 ml of fresh carrot juice, making paste and molding into different sizes and dressing with cardamom seed or poppy seeds and baking at a temperature between 120–150° C. for 5–7 minutes to obtain the biscuits, nugget or powder.

* * * * *